UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

COMPOUND FOR FURNACE-LININGS AND FIRE-BRICK.

SPECIFICATION forming part of Letters Patent No. 265,072, dated September 26, 1882.

Application filed September 1, 1882. (No specimens.)

*To all whom it may concern:*

Be it known that I, JAMES HENDERSON, of Bellefonte, county of Centre, and State of Pennsylvania, (formerly of New York city,) have invented a new and useful Improvement in Compounds for Furnace-Linings and Fire-Brick, of which the following is such specification as will enable those skilled in the art to understand and make the same.

This my invention is based on the discovery that a compound of silica, magnesia, and water forms a substance which is hard and refractory when used as a lining for furnaces, converters, or other metallurgic vessels, and that glucose or analogous vegetable substances from which sugar or starch may be derived may be incorporated in the compound with good results, as hereinafter specified.

In carrying out this my invention I use the purer qualities of sea-sand or pulverized sandstone, such as is used in the manufacture of glass; or washed river-sand, such as is used for lining hearths of furnaces used for heating iron, will answer the purpose, or that which contains magnesia in the natural state, such as steatite. The silica is preferably reduced to a fine flour, so that it will pass through a sieve of about three thousand six hundred meshes to the square inch. Glucose and water are mixed together, preferably in the proportions of one part of glucose to one and a half (1½) part of water, by bulk, and this mixture is mixed with the sand and magnesia so as to form a thick mortar. This mortar may be applied to the bottoms and sides of reverberatory furnaces, or as a lining to other metallurgic vessels, and dried by the atmosphere, when it is ready for use. Linings and bricks thus made are hard and refractory.

Instead of magnesia, the mineral steatite or soapstone, which is a compound of silica and magnesia, may be used in proportions to yield the required quantity of magnesia. The magnesia is used in the form of flour, which is produced by calcining the carbonate of magnesia, slaking or hydrating it with water, and drying and reducing it to flour. This is added to the ingredients of the compound of silica, glucose, and water in the proportion of about five per cent. of magnesia, by weight, to the silica or sand used. The magnesia is preferred mixed with the glucose and water to form milk of magnesia, and the sand added to it; or the magnesia may be mixed in the dry state with the sand or silica, and the glucose in admixture with water be added to it. When steatite is used it is reduced to flour and mixed with the silica, as above described, preferably in proportions to yield about five (5) per cent. of magnesia to the compound, by weight.

This compound of silica, magnesia, glucose, and water, when exposed to high temperatures, does not expand or contract, and is hard, firm, and refractory.

Bricks made of this compound may be burned in kilns after being dried.

Instead of glucose, as above specified, I may use dextrine, starch, cellulose, gum-arabic, molasses, or like substances from which sugar or starch may be extracted, and dissolve them in the water. Wheat, rye, or other grain flour, pea, bean, or oat meal, wood pulp, or other like vegetable material from which sugar or starch may be extracted, may be added to the water in a finely-divided condition, and mixed with it to a thin paste, or so that the finely-divided substances are held in suspension, and this water or thin paste used in making the compound.

For the purposes of this invention the substances above set forth are the equivalents of glucose when used as herein described.

I do not wish to be understood as limiting myself to the exact proportions of glucose herein given, as less glucose may be used, provided sufficient glucose or other binding substance be used to bind the silica and magnesia together. When a substitute for glucose, as above given, is used, the compound may be treated in the same manner as when glucose is used—that is, used wet as a lining or molded into bricks and dried. Nor do I wish to be understood as limiting myself to the exact proportions of magnesia hereinbefore given, as good results may be obtained when up to fifteen per cent. or less to one per cent. of the compound is used. When more of the magnesia is used the bricks are not so refractory; but they are equally refractory when less is used, but are liable to expand at high temperatures in the latter case.

I do not claim in this application the compound of silica, magnesia, and water, as that is claimed in another application, filed about the 22nd day of August, 1882, made by me.

In using the foregoing invention it is desirable that the silica or sand and the magnesian material shall be practically free of oxide of iron or other substances that would form a fusible compound with sand and magnesia when used at high temperatures.

What I do claim, and desire to secure by Letters Patent, is—

1. The compound for furnace-linings and fire-brick, consisting of silica, a vegetable substance from which starch or sugar may be extracted, magnesia, and water, as specified and set forth.

2. The compound for furnace-linings and fire-brick, consisting of silica, glucose, magnesia, and water, as specified and set forth.

JAMES HENDERSON.

Witnesses:
G. G. FRELINGHUYSEN,
W. L. BENNEM.